United States Patent [19]

Greiman

[11] 4,270,760
[45] Jun. 2, 1981

[54] SEALING ASSEMBLY

[76] Inventor: Myrl H. W. Greiman, 5100 Wise Ave., St. Louis, Mo. 63110

[21] Appl. No.: 84,835

[22] Filed: Oct. 15, 1979

[51] Int. Cl.³ .......................... F16J 15/26; F16J 15/40
[52] U.S. Cl. ..................................... 277/3; 277/72 R; 277/74; 277/75
[58] Field of Search .......................... 277/3, 27, 47–51, 277/59, 70–71, 72 R, 72 FM, 74–77, 79, 215

[56] References Cited

U.S. PATENT DOCUMENTS

| 2,321,927 | 6/1943 | McCoy et al. | 277/75 X |
|---|---|---|---|
| 3,468,259 | 9/1969 | Morzynski et al. | 277/74 X |
| 3,776,558 | 12/1973 | Maurer et al. | 277/71 X |
| 3,834,715 | 9/1974 | Butler | 277/59 X |
| 3,887,199 | 6/1975 | Sundquist | 277/74 |
| 3,907,307 | 9/1975 | Maurer et al. | 277/71 X |
| 4,021,050 | 5/1977 | Powers | 277/75 |
| 4,153,259 | 5/1979 | Torstensson | 277/75 |

FOREIGN PATENT DOCUMENTS 850234 10/1960 United Kingdom .................. 277/3

Primary Examiner—Robert S. Ward, Jr.
Attorney, Agent, or Firm—Senniger, Powers, Leavitt and Roedel

[57] ABSTRACT

An assembly for sealing clearance space around a shaft between the shaft and a surrounding member comprising a housing mounted adjacent the clearance space in fixed position relative to the shaft, the latter extending through the housing. A relatively rigid sealing ring is mounted in the housing around the shaft and is secured in fixed position relative to the housing. An annular recess opens radially inwardly around the shaft at the side of the ring toward the clearance space. Passaging in the ring communicates with this recess. The housing has an inlet for delivery of gas under pressure via the passaging in the ring to the recess, the gas flowing along the shaft and into the clearance space for inhibiting escape through the clearance space of material tending to move therethrough in a direction opposite to the gas flow.

41 Claims, 5 Drawing Figures

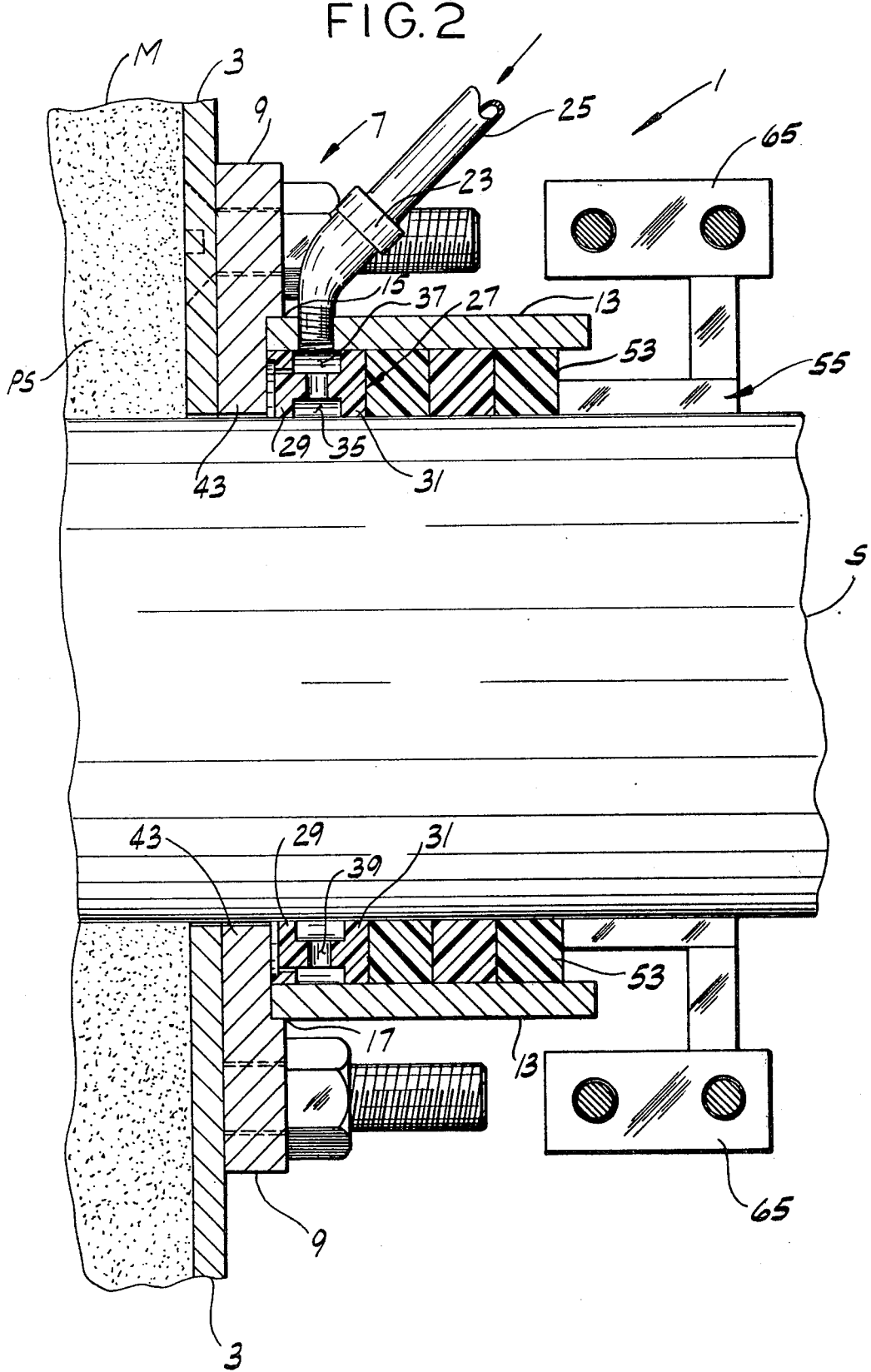

SEALING ASSEMBLY

BACKGROUND OF THE INVENTION

This invention relates generally to means for sealing clearance space between a rotary shaft and a member surrounding the shaft, and more particularly to a sealing assembly of the "air-purge" type, that is, the type utilizing the flow of a gas under pressure to effect the sealing action.

This invention is especially directed to a sealing assembly for sealing the clearance space between the drive shaft of a mixer, for example, and the surrounding wall through which the shaft extends so as to prevent escape through the clearance space of material being mixed by the mixer. Sealing of this clearance space presents a particularly difficult problem when the material being mixed is relatively fine-grain and fluent, such as a powdered sugar mix or a cake frosting mix. Seals heretofore used to prevent escape of this material from the mixer have been largely ineffective, primarily because the powdery material has tended to work its way into the sealing area where it quickly abrades the sealing elements with consequent loss of effective sealing action. As a result, it has been necessary either to replace the sealing elements at frequent intervals at high cost, or suffer escape of material from the mixer.

Reference may be made to U.S. Pat. Nos. 3,887,199, 4,021,050 and 4,153,259 for sealing devices of the air-purge type.

SUMMARY OF THE INVENTION

Among the several objects of this invention may be noted the provision of an improved sealing assembly which effectively seals clearance space between a rotary shaft and a surrounding member; the provision of such an assembly which is of the "air-purge" type and which delivers an increased volume of air or other gas under pressure to the clearance space for preventing escape therethrough of material tending to move in a direction opposite to the direction of air flow; the provision of such an assembly which provides effective sealing action over an increased period of time without replacement of the sealing elements; and the provision of such an assembly which is adapted for quick and easy cleaning of the sealing elements without removal of the assembly from the shaft.

Generally, an assembly of this invention for sealing clearance space around a shaft between the shaft and a surrounding member comprises a housing adapted to be mounted adjacent the clearance space in fixed position relative to the shaft with the latter extending through the housing. The assembly further includes a relatively rigid sealing ring mounted in the housing around the shaft and having a clearance fit therewith, and means for securing the ring in fixed position relative to the housing. An annular recess opens radially inwardly around the shaft at the side of the ring toward the clearance space. Passaging in the ring communicates with this recess and an inlet in the housing enables gas to be delivered under pressure via said passaging to the recess, the gas flowing along the shaft and into the clearance space for inhibiting escape through the clearance space of material tending to move therethrough in a direction opposite to the gas flow.

Other objects and featurers will be in part apparent and in part pointed hereinafter.

BRIEF DESCRIPTION OF THE DRAWINGS

FIG. 2 is a longitudinal section of the sealing assembly shown in FIG. 1;

Corresponding reference characters indicate corresponding parts throughout the several views of the drawings.

DESCRIPTION OF THE PREFERRED EMBODIMENT

Figure 1:
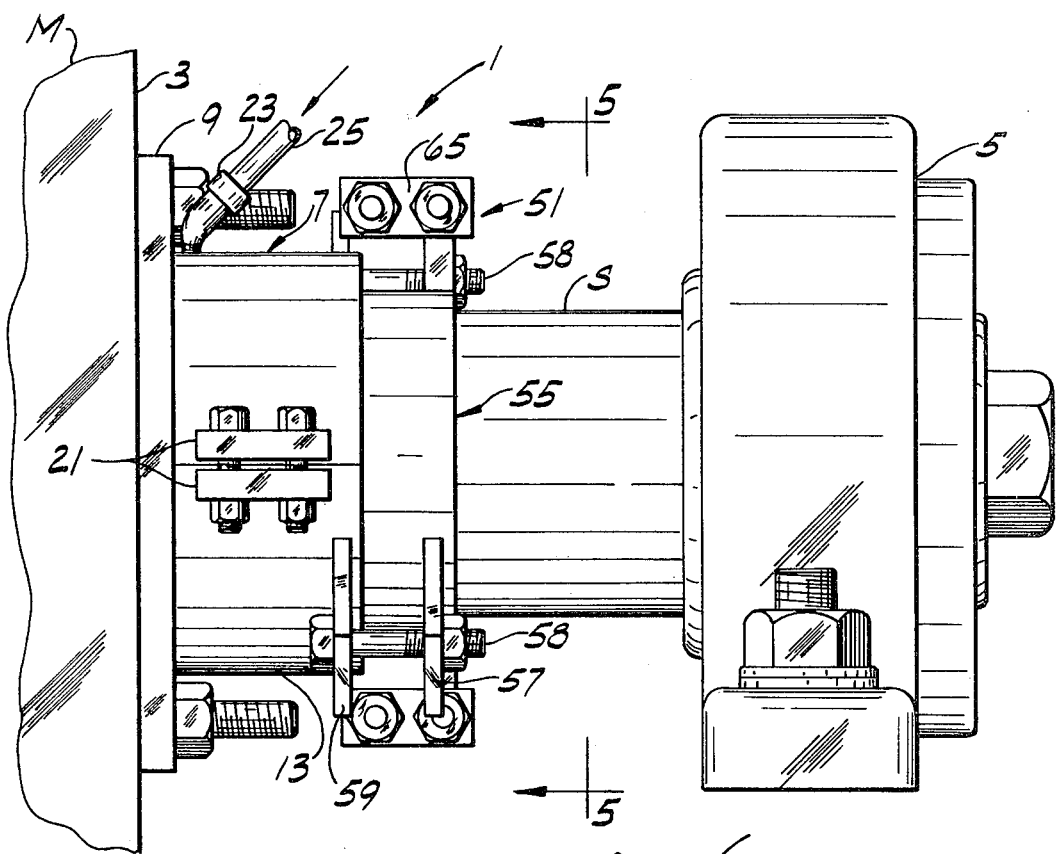
FIG. 1 is a side elevation of a sealing assembly of this invention mounted on a side wall of a mixer around a horizontal drive shaft of the mixer.

Referring now to the drawings, particularly to FIGS. 1 and 2, a sealing assembly of this invention is designated generally by the reference numeral 1 and is shown sealing the clearance space C1 between a shaft S and a surrounding member 3 through which the shaft extends. As illustrated, but by way of example only, shaft S is a horizontally mounted rotary drive shaft for a mixer M and the member 3 is a side wall of the mixer. The shaft extends from inside the mixer through an opening in the wall and has its outer (right) end journalled in a conventional pillow block bearing indicated at 5. The sealing assembly functions to inhibit escape through clearance space C1 of material being mixed in the mixer, such as a powdered sugar mix designated PS in FIG. 2.

The sealing assembly 1 includes a metal housing generally designated 7 mounted on the outside of mixer wall 3 in fixed position relative to the shaft S which extends horizontally through the housing. The latter comprises a vertical mounting plate 9 bolted to the side wall 3 of the mixer and having a circular opening therein for receiving shaft S, the clearance space between the shaft and the surrounding plate 9 being designated C2. The housing 7 also includes a cylindrical body or retaining ring 13 rigidly secured as by welding to plate 9 and extending outwardly (to the right) therefrom coaxially with shaft S. A fitting 23 threaded in an inlet opening 24 in retaining ring 13 adjacent mounting plate 9 constitutes an inlet for delivery via a line 25 of air or other gas under pressure to the housing. For facilitating installation around the shaft, the housing is of split construction, comprising substantially identical upper and lower pieces designated 15 and 17, respectively. These pieces have cooperating lugs 21 which are bolted together to hold the two pieces in assembly.

Figure 3:
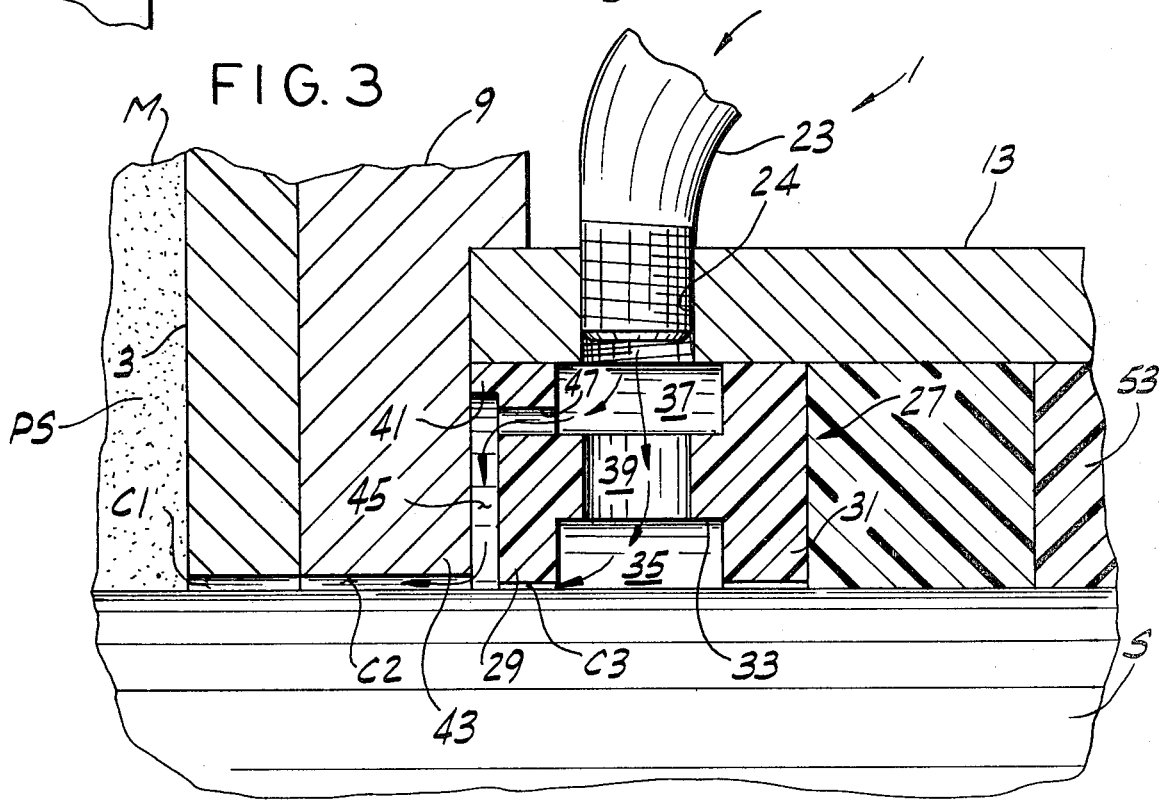
FIG. 3 is an enlarged view of a portion of FIG. 2 showing a sealing ring of the present invention.

Mounted in the retaining ring 13 adjacent end plate 9 and around the shaft S is a sealing ring generally indicated at 27 of relatively rigid material which is relatively nonexpansible in a radial direction with respect to the ring, preferably a synthetic resin such as nylon, or that sold under the trademark "Teflon" by E. I. Du Pont De Nemours Co. It will be understood, however, that the sealing ring 27 could also be of a suitable metal such as bronze. Sealing ring 27 is a split ring comprising a plurality (e.g., two) of sections, and has a relatively loose clearance fit (0.030 inch or 0.76 mm, for example) with the shaft and with the inside cylindrical surface of retaining ring 13. As shown in FIGS. 2 and 3, the ring is generally H-shaped in vertical section and comprises first (left) and second (right) generally parallel sealing lips extending radially of the ring (i.e., vertically), the left lip being designated 29 and the right lip 31. A web 33 extends generally axially (horizontally) of the ring between the lips. The lips and web define an inner annular groove 35 opening radially inwardly toward the shaft and an outer annular groove 37 opening radially outwardly toward the retaining ring. The inlet opening 24 communicates with the outer groove 37 for delivery of pressurized air thereto. The inner and outer grooves 35, 37 are in communication with one another via passaging comprising a plurality (e.g., 4) of holes, each designated 39, through the web 33 of the sealing ring. These holes 39 are spaced at equal (e.g., 90°) intervals around the ring.

As shown best in FIG. 3, the left lip 29 of the sealing ring is relieved (e.g., counterbored) to form an annular flange 41 at the outer periphery of the lip extending axially of the ring toward the mounting plate 9 of the housing. This flange is engageable with the portion 43 of the mounting plate immediately surrounding the shaft and extending radially inwardly from the left end of retaining ring 13.

Figure 4:
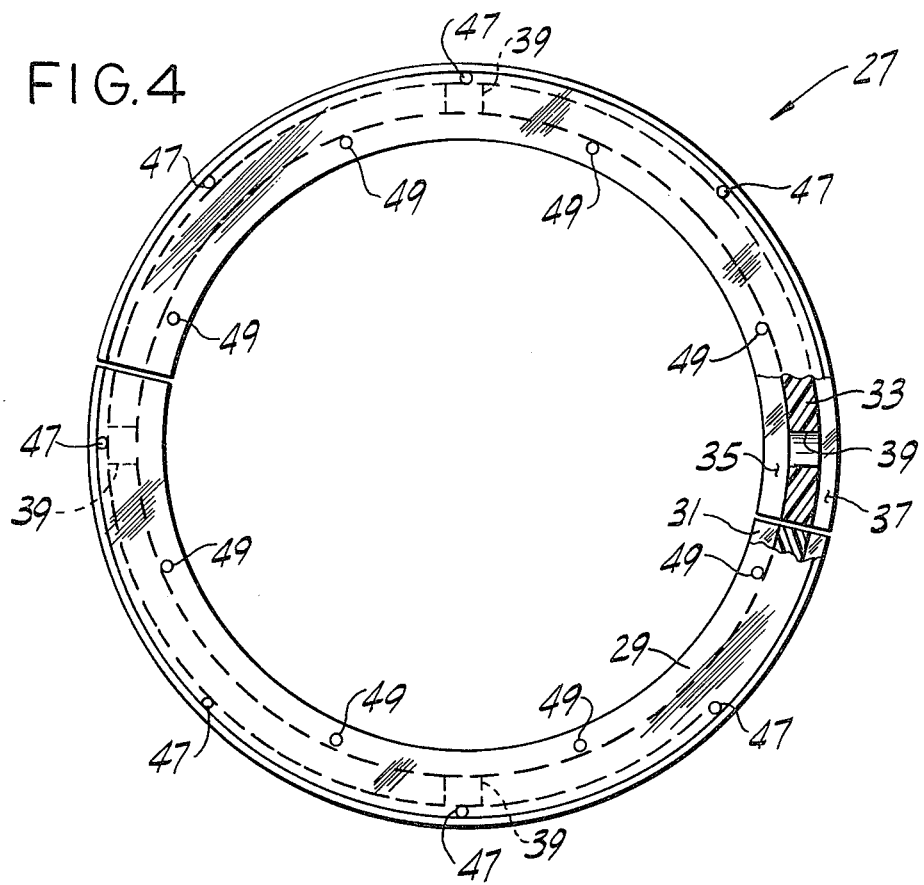
FIG. 4 is an elevation of the sealing ring with parts broken away to illustrate details.

Flange 41 thus constitutes means for spacing the left face of sealing lip 29 from the right face of portion 43 of mounting plate 9 so as to provide an annular recess 45 therebetween opening radially inwardly around the shaft. This recess communicates via clearance spaces C1 and C2 with the inside of mixer M. The recess also communicates with the inner and outer annular grooves 35, 37 in the sealing ring 27 by means of passaging in the left sealing lip 29. This passaging comprises a first series of eight relatively small-diameter passages or orifices 47 extending between the outer groove and the recess, and a second series of eight relatively small-diameter orifices 49 extending through the lip between the inner groove and the recess. As shown in FIG. 4, these sixteen orifices are spaced at regular intervals around the ring, with orifices 47 being staggered circumferentially with respect to orifices 49. This pattern ensures uniform delivery of air from the inner and outer grooves to recess 45. The inner annular groove 35 also communicates with recess 45 via clearance space C3 (which may be a 0.030 inch or 0.76 mm clearance space, for example) between the shaft S and the left sealing lip 29.

It will be noted that the combined flow area of the sixteen orifices 47, 49 is preferably approximately equal to or greater than the flow area of the inlet opening 24 in the housing. For example, each orifice may be 1/16 inch (1.59 mm) in diameter and the inlet opening ¼ inch (6.35 mm) in diameter. It is important that the combined flow area of orifices 47, 49 be at least as great as the flow area of inlet opening 24 so that air or other gas under pressure is delivered from the inlet to recess 45 with no substantial drop in pressure between the inlet and the recess.

Indicated generally at 51 is means for securing the ring in fixed position relative to the housing. This means comprises a plurality (e.g., three) of packing rings 53 around shaft S in the retaining ring 13 at the right side of sealing ring 27. These packing rings 53 may be of any suitable packing material. Means 51 also includes a metal ring 55 constituting a gland mounted on the shaft S and movable axially in retaining ring 13 for forcing the packing rings 53 against the right side of the sealing ring 27. This clamps the annular flange 41 at the left side of the ring against portion 43 of the mounting plate 9 (which therefore constitutes abutment means) to secure the sealing ring in fixed position relative to the housing. When the packing rings 53 are forced by gland 55 against sealing ring 27, the rings are compressed and expand radially inwardly into sealing engagement with the shaft and radially outwardly into sealing engagement with the inner cylindrical surface of retaining ring 13, thereby preventing escape therepast of gas under pressure delivered through fitting 23.

Figure 5:
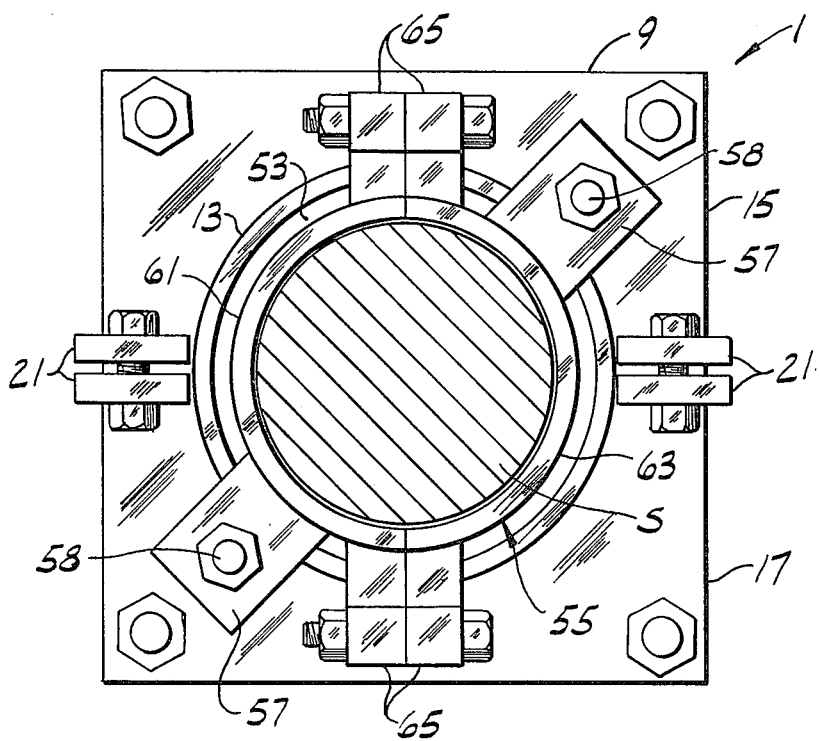
FIG. 5 is a vertical section on line 5—5 of FIG. 1.

Gland 55 has a pair of diametrically opposed flanges 57 extending outwardly therefrom in radial planes (see FIGS. 1 and 5). These flanges 57 are bolted as indicated at 58 to corresponding flanges 59 projecting radially outwardly from the retaining ring 13 of the housing to secure the gland in fixed position relative to the housing. By tightening or loosening the nuts on bolts 58, the clamping force exerted by the gland against the packing rings 53 may be varied as needed. For convenience of installation on the shaft S, gland 55 comprises two semicircular sections, the left section as viewed in FIG. 5 being designated 61 and the right section 63. These sections have mounting lugs 65 thereon which are bolted together for holding the sections in assembly around the shaft.

Operation of the sealing assembly 1 is as follows:

For sealing clearance space C1, air or other suitable gas is delivered at relatively low pressure (e.g., 5–10 psi) via line 25 to fitting 23 and thence to inner and outer grooves 35, 37 in the sealing ring 27 for distribution around the shaft S. Air flows from these grooves via orifices 47 and 49 into the annular recess 45 at the left of the sealing ring. Some air also flows, via clearance space C3, from the inner groove 35 into recess 45. Air under pressure in recess 45 flows to the left along the shaft through clearance space C2 and into clearance space C1 thereby inhibiting escape therethrough of powdered sugar PS in a direction opposite to the air flow (i.e., to the right). Thus, escape of powdered sugar from the mixer is reduced. In addition, the life of the sealing assembly in general and sealing ring 27 in particular is increased in that material within the mixer M is prevented from moving along the shaft into recess 45 and clearance space C3 where it would cause extensive abrasion and deterioration of the sealing ring 27.

The construction of the sealing assembly of this invention is advantageous in that it enables gas under pressure to be delivered to clearance space C1 at relatively high rates and velocities for more effectively sealing this space. In this connection, it will be observed that since the combined flow area of the sixteen orifices 47, 49 is approximately equal to that of inlet opening 24, pressurized air is delivered from the inlet opening to recess 45 and thence to clearance space C1 with virtually no decrease in flow rate or pressure drop.

Sealing assembly 1 of this invention may readily be cleaned while in place on the shaft S simply by forcing a liquid (e.g., water) into the housing via inlet fitting 23. The resulting flush of liquid through the passaging in the sealing ring 27, recess 45 and clearance spaces C1–C3 removes any build-up of powdered sugar or other foreign substances in this area.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An assembly for sealing clearance space around a shaft between the shaft and a surrounding member comprising a housing adapted to be mounted adjacent said clearance space in fixed position relative to the shaft, the latter extending through the housing, a relatively rigid sealing ring mounted in the housing around the shaft and having a clearance fit therewith, means for securing the ring in fixed position relative to the housing, an annular recess opening radially inwardly around the shaft at the side of the ring toward said clearance space, passaging in the ring communicating with said recess, and an inlet in the housing for delivery of gas under pressure via said passaging to said recess, the gas flowing along the shaft and into said clearance space for inhibiting escape through the clearance space of material tending to move therethrough in a direction opposite to said gas flow.

2. A sealing assembly as set forth in claim 1 wherein the flow area of said passaging is sufficient for delivery of gas under pressure from said inlet to said recess with substantially no drop in pressure.

3. A sealing assembly as set forth in claim 1 wherein said sealing ring has means at the side thereof toward said clearance space for providing said recess.

4. A sealing assembly as set forth in claim 3 wherein said means for providing said recess comprises annular flange means projecting axially of the ring.

5. A sealing assembly as set forth in claim 4 wherein said annular flange means comprises an annular flange at the outer periphery of the ring.

6. A sealing assembly as set forth in claim 3 wherein said housing comprises a body having a generally circular opening therethrough for receiving said shaft, and abutment means extending radially inwardly from the body into said opening, said means at the side of the ring for providing said recess being engageable with said abutment means for spacing the ring therefrom thereby to provide said recess between the ring and the abutment means.

7. A sealing assembly as set forth in claim 6 wherein said means engageable with said abutment means comprises annular flange means projecting axially from the ring.

8. A sealing assembly as set forth in claim 6 wherein said securing means comprises means for applying pressure axially of the ring against the side of the ring opposite said clearance space thereby to clamp said annular flange against said abutment means.

9. A sealing assembly as set forth in claim 1 wherein said ring has an inner annular groove therein opening radially inwardly around the shaft, said groove communicating via said passaging with said recess, and said inlet communicating via said passaging with said groove for delivery of gas under pressure to the groove.

10. A sealing assembly as set forth in claim 9 wherein said passaging comprises a series of passages extending generally axially through the ring between said groove and said recess.

11. A sealing assembly as set forth in claim 9 wherein said ring is generally H-shaped in section, comprising first and second generally parallel sealing lips extending radially of the ring and a web extending generally axially of the ring between the lips, said first lip being the one toward the clearance space, said lips and web defining said inner annular groove and an outer annular groove opening radially outwardly, said inner and outer grooves communicating with one another and said recess via said passaging.

12. A sealing assembly as set forth in claim 11 wherein said sealing ring has means at the side thereof toward said clearance space for providing said recess.

13. A sealing assembly as set forth in claim 12 wherein said means for providing said recess comprises annular flange means on the first sealing lip extending axially of the ring away from said second sealing lip.

14. A sealing assembly as set forth in claim 13 wherein said annular flange means comprises an annular flange projecting axially from said first sealing lip at the outer periphery thereof.

15. A sealing assembly as set forth in claim 11 wherein said passaging comprises a first series of passages extending generally axially of the ring through said first sealing lip for providing communication between said inner groove and said recess.

16. A sealing assembly as set forth in claim 15 wherein said passaging further comprises a second series of passages extending axially of the ring through said first sealing lip for providing communication between said outer groove and said recess.

17. A sealing assembly as set forth in claim 16 wherein the passages in said first series are spaced at regular intervals around the ring and the passages in said second series are spaced at regular intervals around the ring.

18. A sealing assembly as set forth in claim 17 wherein the combined flow area of said first and second series of passages is approximately equal to or greater than the flow area of said inlet.

19. A sealing assembly as set forth in claim 17 wherein the passages of one series are staggered circumferentially of the ring in relation to the passages of the other series.

20. A sealing assembly as set forth in claim 1 wherein said ring is a split ring comprising a plurality of sections.

21. A sealing assembly as set forth in claim 1 wherein said ring is of a synthetic resin material.

22. A sealing assembly as set forth in claim 1 wherein said ring is relatively nonexpansible in a radial direction on delivery of gas under pressure thereto.

23. A sealing assembly as set forth in claim 1 wherein said housing comprises a generally cylindrical body and abutment means extending radially inwardly from said body, said ring having flange means thereon at the side thereof toward said clearance space engageable with said abutment means for spacing the ring therefrom thereby to provide said recess, said securing means comprising packing in the body at the side of the ring away from said clearance space, and a gland movable axially in the body for compressing the packing against the ring thereby to clamp said flange means against said abutment means for securing the ring in fixed position relative to the housing.

24. A sealing assembly as set forth in claim 1 wherein said securing means is at the side of the ring opposite said clearance space and is adapted for sealing engagement with the shaft and the housing for preventing escape therepast of said gas under pressure.

25. In an assembly for sealing clearance space around a shaft between the shaft and a surrounding member, said assembly comprising a housing adapted to be mounted adjacent said clearance space in fixed position relative to the housing with the shaft extending through the housing, and an inlet in the housing for delivery of gas under pressure thereto, a sealing ring adapted to be mounted in the housing around the shaft and to have a clearance fit with the shaft, means at the side of the ring toward said clearance space for providing an annular recess opening radially inwardly around the shaft at said side of the ring, passaging in the ring providing communication between said inlet and said recess for delivery of gas under pressure to said recess, the gas flowing along the shaft and into the clearance space for inhibiting escape through the clearance space of material tending to move therethrough in a direction opposite to said gas flow.

26. In a sealing assembly as set forth in claim 25, said means for providing said recess comprising annular flange means projecting axially of the ring.

27. In a sealing assembly as set forth in claim 25 wherein said housing comprises a body having a generally circular opening therethrough for receiving said shaft, and abutment means extending radially inwardly from the body into the opening, said means at the side of the ring for providing said recess being engageable with said abutment means for spacing the ring therefrom thereby to provide said recess between the ring and the abutment means.

28. In a sealing assembly as set forth in claim 27, said means for providing said recess comprising annular flange means projecting axially of the ring.

29. In a sealing assembly as set forth in claim 25, said ring having an inner annular groove therein opening radially inwardly around the shaft, said groove communicating via said passaging with said recess, and said inlet communicating via said passaging with said groove for delivery of gas under pressure to said groove.

30. In a sealing assembly as set forth in claim 29, said passaging comprising a series of passages extending generally axially through the ring between said groove and said recess.

31. In a sealing assembly as set forth in claim 29, said ring being generally H-shaped in section, comprising first and second generally parallel sealing lips extending radially of the ring and a web extending generally axially of the ring between the lips, said first lip being the one toward the clearance space, said lips and web defining said inner annular groove and an outer annular groove opening radially outwardly, said inner and outer grooves communicating with one another and said recess via said passaging.

32. In a sealing assembly as set forth in claim 31, said sealing ring having means at the side thereof toward said clearance space for providing said recess.

33. In a sealing assembly as set forth in claim 32, said means for providing said recess comprising annular flange means projecting axially of the ring from the first sealing lip.

34. In a sealing assembly as set forth in claim 33, said annular flange means being at the outer periphery of said first sealing lip.

35. In a sealing assembly as set forth in claim 31, said passaging comprising a first series of passages extending axially of the ring through said first sealing lip for providing communication between said inner groove and said recess.

36. In a sealing assembly as set forth in claim 35, said passaging further comprising a second series of passages extending axially of the ring through said first sealing lip for providing communication between said outer groove and said recess.

37. In a sealing assembly as set forth in claim 36, said passages in said first series being spaced at regular intervals around the ring and the passages in said second series being spaced at regular intervals around the ring.

38. In an assembly as set forth in claim 37, the passages of one series being staggered circumferentially of the ring in relation to the passages of the other series.

39. In an assembly as set forth in claim 25, said ring being a split ring comprising a plurality of sections.

40. In an assembly as set forth in claim 25, said ring being of a synthetic resin material.

41. In an assembly as set forth in claim 25, said ring being relatively nonexpansible in a radial direction on delivery of gas under pressure thereto.

* * * * *